Jan. 27, 1953     Y. A. BOUGET ET AL     2,626,821
LOCKING TYPE CLUTCH
Filed Feb. 21, 1949     2 SHEETS—SHEET 1
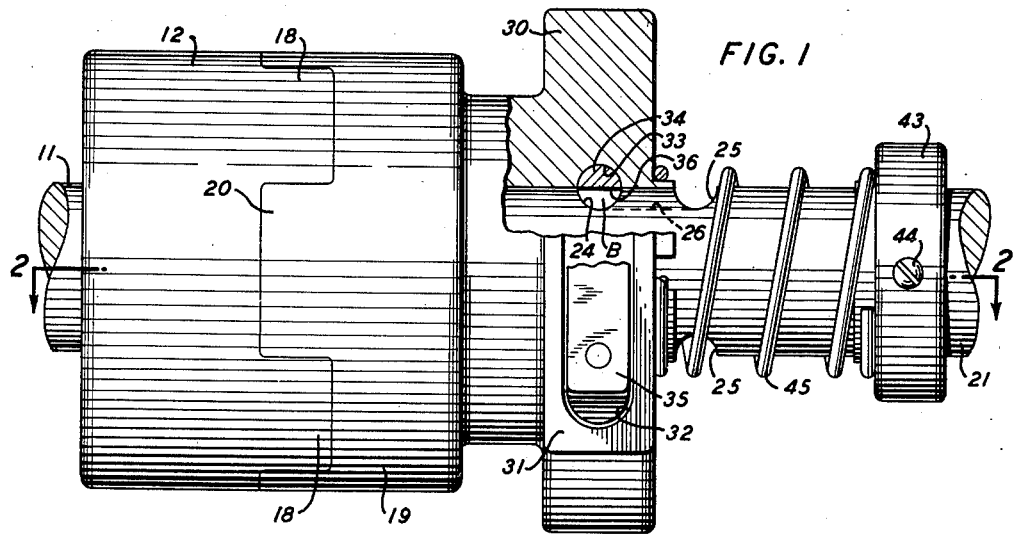
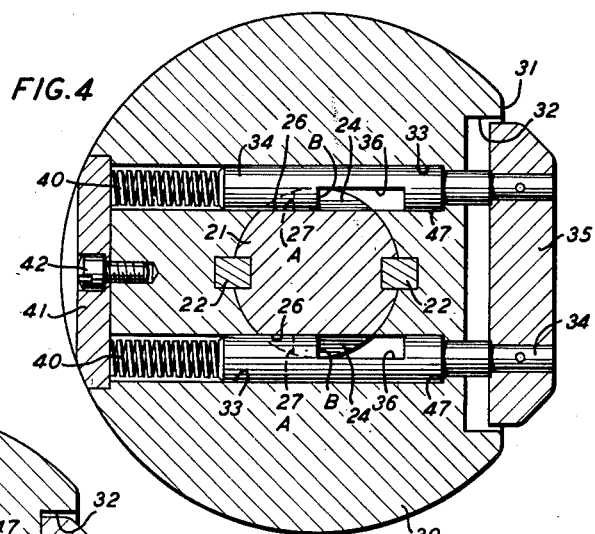
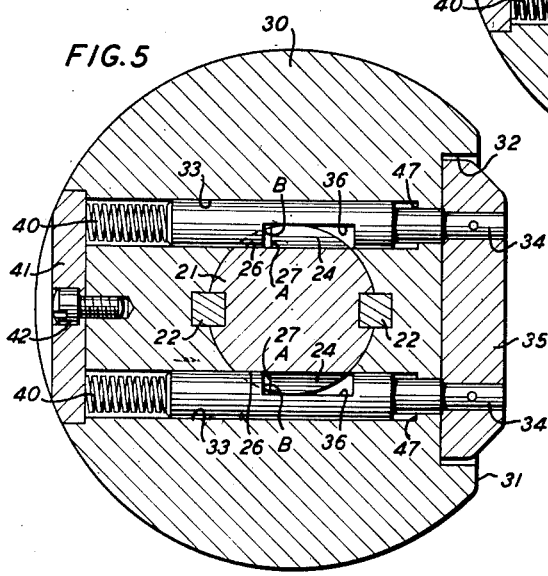
INVENTORS
Y. A. BOUGET
C. E. MAGNUSON
BY
*W. C. Parnell*
ATTORNEY Jan. 27, 1953     Y. A. BOUGET ET AL     2,626,821
LOCKING TYPE CLUTCH
Filed Feb. 21, 1949
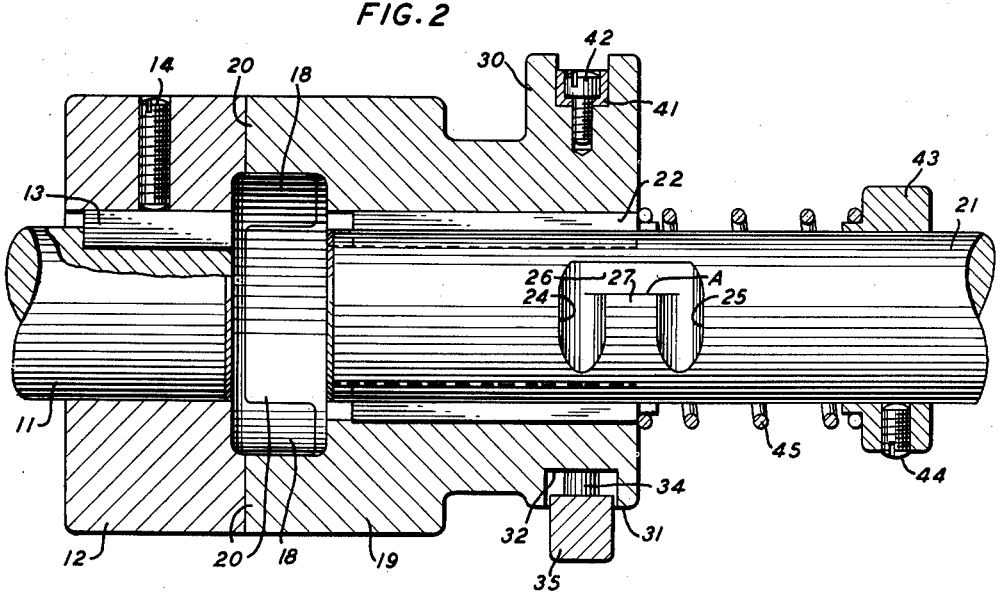
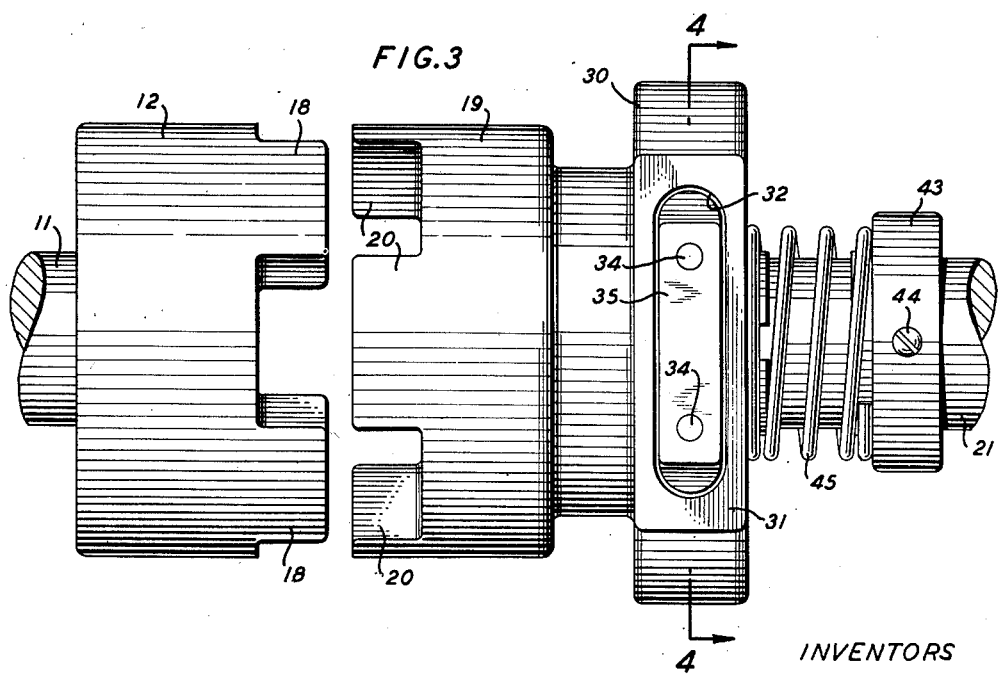
INVENTORS
Y. A. BOUGET
C. E. MAGNUSON
BY
W. C. Parnell
ATTORNEY Patented Jan. 27, 1953

2,626,821

UNITED STATES PATENT OFFICE 2,626,821

LOCKING TYPE CLUTCH

Yves A. Bouget, West Orange, and C. Edwin Magnuson, Hasbrouck Heights, N. J., assignors to Western Electric Company, Incorporated, New York, N. Y., a corporation of New York Application February 21, 1949, Serial No. 77,594

5 Claims. (Cl. 287—52.05)

This invention relates to clutches, and it is an object of this invention to provide a means for locking a clutch in its engaged and disengaged positions which is simple and positive in operation.

It is often desirable when using auxiliary drives on production lines, such as, for example, a taping head used in connection with cable stranders, to disconnect the auxiliary drive to prevent it from performing its function during certain parts of the process. The original driving connection and subsequent disconnection are almost universally performed by some form of clutching action. The features which are especially needed in such a clutch are positive engagement and disengagement, and some means of insuring against accidental engagement when the clutch is in a disengaged position.

Applicants have invented a clutch having a device which locks the driven half in both engaged and disengaged positions, and which requires a positive and definite effort on the part of the operator before the driven half can be moved from its locked position. In the preferred embodiment, this is accomplished by providing a driven shaft with two sets of transverse grooves, one corresponding to the engaged position and the other to the disengaged position. The driven clutch member, which is slidable relative to the driven shaft, contains pins which cooperate with each set of grooves and the shaft to allow axial movement of the driven clutch member with respect to the driven shaft when the pins are in one position and prevent it when they are in a second position.

Other advantages and features will be apparent from the following detailed description taken in conjunction with the attached drawings in which:

Fig. 1 is a side elevational view of the clutch assembly locked in its engaged position with a partial section showing the relation between the locking pins and the two sets of grooves;

Fig. 2 is a view of the invention, sectional except for the shaft, and taken along the line 2—2 of Fig. 1;

Fig. 3 is another side elevational view of the clutch assembly locked in its disengaged position;

Fig. 4 is a sectional view taken along the line 4—4 of Fig. 3 and shows the position of the pins in a locked position;

Fig. 5 is another sectional view taken along the line 4—4 of Fig. 3 and shows the position of the pins which allows axial movement of the driven clutch member along the driven shaft.

With reference to the drawings, the driving shaft of the clutch assembly is designated by the numeral 11. Driving relation with a driving clutch member 12 is established through a key 13, while set screw 14 aids in maintaining a rigid driving relation.

Projections 18 are formed integrally with the driving clutch member 12 and are so sized as to form an equal number of indentations having a corresponding size and shape. Driven clutch member 19 has projections 20 which are shaped to fit snugly into the indentations of driving member 12. It also has indentations in its own surface formed by its projections 20, and into these fit projections 18 of the driving member 12. The interlocking of these projections and indentations assures a firm driving engagement between the driving and the driven halves of the clutch assembly.

The driven clutch member 19 is mounted on a driven shaft 21 by means of keys 22. Enough play is present between the driven member, driven shaft and keys to allow axial movement of the driven member with respect to its shaft along the keyway. However, the slight play which is present does not interfere with the firm driving engagement which is present between the driven member and the driven shaft.

The driven shaft 21 contains two separate sets of grooves, located transversely to the length of the shaft. One set of grooves 24 aids in locking the clutch in an engaged position, while the second set of grooves 25 aids in locking it in a disengaged position. Connecting the two top and the two bottom grooves are cutaway flat portions 26, which lie in the same plane as the bottoms of the two sets of grooves. Shoulders 27, each having a surface A, are formed by the cutaway portions 26, as indicated in Figs. 2, 4 and 5.

At the end of driven clutch member 19 opposite its engaging projections is a flange 30, which is preferably formed to be integral with the driven member 19. One side of the flange has a flattened vertical surface 31, and this surface 31 contains a recess 32.

The flange 30 contains two bores 33 having approximately the same diameter as the grooves 24 and 25. These bores lie in a vertical plane, which are perpendicular to the length of the driven shaft 21 and to the long surface of the recess 32. Positioned partially in the bores 33 and partially in the grooves are two pins 34, which are of slightly less diameter than the bores and grooves to allow them to slide freely. The pins 34 are mounted on a bar 35 as shown so as to form a rigid assembly, and to allow the position of the pins to be varied by moving the bar. Each pin has a reduced portion 36 containing a surface B, as shown in Figs. 4 and 5. The pins act in conjunction with shoulders 27 of the driven shaft 21 to allow or to block movement of the driven clutch member 19 with relation to the driven shaft 21.

Also positioned within the bores 33 are two springs 40, held at one end by the retaining block 41, which in turn is securely held to the flange 30 by the screw 42. The springs 40 serve to press the pins 34 and the bar 35 to the normal outward position shown in Fig. 4. One end of each bore 33 is of reduced size, forming shoulders 47 which act to limit the outward movement of the pins.

A collar 43 is located on the driven shaft 21 and is held in a fixed position in relation to the driven shaft by means of the set screw 44. The collar 43 serves as a rigid retainer for spring 45 which is positioned on the driven shaft 21 between the collar 43 and the flange 30. The spring 45 has the function of normally urging the driven clutch member 19 away from its disengaged position and toward its engaged position.

In the actual operation of the invention, assume that the driven clutch member 19 is in an engaged position, and that it is desired to move it to a disengaged position. To accomplish this, the bar 35 is pressed inwardly as far as it will go. The two pins 34 are forced inwardly a corresponding distance, and the surface B of the reduced portion 36 of the pins now clears the surface A of the driven shaft shoulder 27. The entire driven clutch member including the integral flange 30 may now be moved axially to the right with respect to the driven shaft 21. When this has been done, and the pins 34 have reached a point where they line up with the set of slots corresponding to the disengaged position, the driven member may be locked in the disengaged position by releasing the pressure from the bar 35. The springs 40 will then force the pins 34 and bar 35 to their normal outward position, and in so doing, the reduced portions 36 of the pins are moved accordingly. The surfaces B of these reduced portions no longer clear surfaces A of the shoulders 27 and the driven clutch member becomes blocked from movement in one direction by shoulders 27 and from movement in the other direction by the sides of grooves 25. Thus, by releasing the bar 35, the driven clutch member is effectively locked in its disengaged position.

When it is desired to engage the driving and driven halves of the clutch, the bar 35 is pressed inwardly which, as previously explained, allows the driven clutch member to be moved relative to the shaft. The driven member is then moved along the shaft to its engaged position, where it is locked in this position by releasing the pressure on the bar.

The spring 45 is used to aid in the engagement action by normally urging the driven clutch member towards its position of engagement. In addition, since this urging action prevents the driven member from being at its disengaged position unless it is forcibly moved thereto, the spring acts as a safety feature by requiring a definite effort on the part of the operator to move the driven member from its engaged position to one of disengagement.

It will be noted that the entire locking mechanism rotates with the driven half of the clutch. This, however, presents no problem as the centrifugal force involved is in such direction as to aid the springs 40 in keeping the pins in their outwardly locked position.

The use of the locking feature which is the basis of the invention insures against having the driven clutch member accidentally forced into and out of engagement, since the lock must be purposefully released before the driven clutch member can move relative to the driven shaft. In addition, the releasing force is at right angles to the force required to move the driven member along the shaft which makes it practically impossible for a given unidirectional force to move the driven half accidentally.

The actual operation of unlocking the driven member, moving it to the desired position and locking it there requires little force, which obviates any requirement of an outside force or tools to move the driven half into and out of its clutched position.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A locking mechanism for a member slidably mounted on a rotatable shaft, said mechanism comprising a pin in the member, said pin having a recessed section, two transverse grooves in the shaft for receiving the pin and locking the member in either of two positions on the shaft against movement axially or rotatably relative to the shaft, a relieved section on the shaft between adjacent ends of the grooves to permit passage of the pin from one groove to the other and resilient means normally holding the recessed section of the pin out of alignment with the relieved section of the shaft.

2. A locking mechanism for a member slidably mounted axially on a rotatable shaft, the mechanism comprising a pin movably mounted in the member transversely of the axis thereof and having a locking portion and a recess disposed in another portion thereof extending beyond the periphery of the shaft, two transverse grooves in the shaft for receiving singly the locking portion of the pin for locking the member in either of two positions on the shaft against movement axially or rotatably relative to the shaft, and a relieved section on the shaft between adjacent ends of the grooves to permit passage of the locking portion of the pin from one groove to the other while the recessed portion of the pin passes by the periphery of the shaft between the grooves.

3. A locking mechanism for a member slidably mounted axially on a rotatable shaft, the mechanism comprising a pin movably mounted in the member transversely of the axis thereof and having a locking portion and a recess disposed in another portion thereof extending beyond the periphery of the shaft, two transverse grooves in the shaft for receiving singly the locking portion of the pin for locking the member in either of two positions on the shaft against movement axially or rotatably relative to the shaft, and a relieved section on the shaft between adjacent ends of the grooves to permit passage of the locking portion of the pin from one groove to the other while the recessed portion of the pin passes by the periphery of the shaft between the grooves, resilient means normally urging the pin into locking position, and means actuable to move the pin into its unlocked position normally affected by centrifugal force during rotation of the shaft and member to assist the resilient means in urging the pin into its locking position.

4. A locking mechanism for a member slidably mounted axially on a rotatable shaft, the mechanism comprising parallel pins movably mounted in the member transversely and diametrically opposed with respect to the axis and having locking portions and recesses disposed in other portions thereof extending beyond the periphery of the shaft, two sets of diametrically opposed grooves in the shaft for selectively receiving the locking portions of their pins for jointly locking the member in either of two positions on the shaft against movement axially or rotatably relative to the shaft, and relieved sections on the shaft between adjacent ends of the grooves to permit passage of the locking portions of the pins from one pair of diametrically aligned grooves to the other while the recessed portions of the pins pass by the periphery of the shaft between the pairs of grooves.

5. A locking mechanism for a member slidably mounted axially on a rotatable shaft, the mechanism comprising parallel pins movably mounted in the member transversely and diametrically opposed with respect to the axis and having locking portions and recesses disposed in other portions thereof extending beyond the periphery of the shaft, two sets of diametrically opposed grooves in the shaft for selectively receiving the locking portions of their pins for jointly locking the member in either of two positions on the shaft against movement axially or rotatably relative to the shaft, and relieved sections on the shaft between adjacent ends of the grooves to permit passage of the locking portions of the pins from one pair of diametrically aligned grooves to the other while the recessed portions of the pins pass by the periphery of the shaft between the pairs of grooves, resilient means normally urging the pins into locking positions, a member connected to both pins actuable to simultaneously move the pins into their unlocked position normally affected by centrifugal force to assist the resilient means in urging the pins into their locking positions.

YVES A. BOUGET.
C. EDWIN MAGNUSON.

REFERENCES CITED

The following references are of record in the file of this patent:

UNITED STATES PATENTS

| Number | Name | Date |
|---|---|---|
| 987,370 | Jenness | Mar. 21, 1911 |
| 1,151,616 | Robinson | Aug. 31, 1915 |
| 1,363,788 | Hilton | Dec. 28, 1920 |
| 1,408,993 | Eberhardt | Mar. 7, 1922 |
| 1,513,601 | King | Oct. 28, 1924 |
| 1,645,457 | Schall | Oct. 11, 1927 |
| 1,658,264 | Sutton et al. | Feb. 7, 1928 |
| 1,686,989 | Ridley | Oct. 9, 1928 |
| 1,821,543 | Coultas | Sept. 1, 1931 |
| 2,029,174 | Junge | Jan. 28, 1936 |
| 2,101,897 | Coultas | Dec. 14, 1937 |
| 2,309,249 | Karp | Jan. 26, 1943 |